US012613510B2

(12) United States Patent     (10) Patent No.:   US 12,613,510 B2

Najmark et al.     (45) Date of Patent:    Apr. 28, 2026

(54) ON-ROBOT DATA COLLECTION

(71) Applicant: GDM Holding LLC, Mountain View, CA (US)

(72) Inventors: Sarah Najmark, Paris (FR); Ammar Husain, Palo Alto, CA (US)

(73) Assignee: GDM Holding LLC, Mountain View, CA (US)

( * ) Notice: Subject to any disclaimer, the term of this patent is extended or adjusted under 35 U.S.C. 154(b) by 100 days.

(21) Appl. No.: 18/420,267

(22) Filed: Jan. 23, 2024

(65) Prior Publication Data

US 2024/0248458 A1     Jul. 25, 2024

Related U.S. Application Data

(60) Provisional application No. 63/481,356, filed on Jan. 24, 2023.

(51) Int. Cl.
| | |
|---|---|
| *B25J 9/16* | (2006.01) |
| *B25J 13/00* | (2006.01) |
| *G05B 19/4155* | (2006.01) |
| *G05D 1/648* | (2024.01) |
| *G05D 105/80* | (2024.01) |

(52) U.S. Cl.
CPC ........ *G05B 19/4155* (2013.01); *B25J 9/1671* (2013.01); *B25J 9/1697* (2013.01); *B25J 13/006* (2013.01); *G05D 1/648* (2024.01); *G05B 2219/39059* (2013.01); *G05D 2105/87* (2024.01)

(58) Field of Classification Search
CPC ...... B25J 9/1671; B25J 9/1697; B25J 13/006; G05D 1/648; G05D 2105/87; G05B 19/4155; G05B 2219/39059
See application file for complete search history.

(56) References Cited

U.S. PATENT DOCUMENTS

| | | | | |
|---|---|---|---|---|
| 9,067,321 | B2 * | 6/2015 | Landsnes | ............... B25J 9/1674 |
| 10,926,416 | B2 * | 2/2021 | Soltani Bozchalooi | ..................... |
| | | | | G06V 10/82 |
| 12,214,500 | B2 * | 2/2025 | Pivac | ................... G05D 1/0282 |
| 12,220,821 | B2 * | 2/2025 | Shiratsuchi | .............. B25J 9/163 |
| 2023/0038337 | A1 * | 2/2023 | Heinzemann | ........ G06V 10/776 |

* cited by examiner

*Primary Examiner* — Dalena Tran
(74) *Attorney, Agent, or Firm* — McDonnell Beohnen Hulbert & Berghoff LLP

(57) ABSTRACT

Systems and methods are provided for improved generation and selection of robot sensor data for manual annotation and/or use in training machine learning models used to operate robots. An on-robot controller can operate to determine a cross-modal inconsistency, that a temporally proximate target task was failed, and/or that a confidence in a model output indicate that particular sensor data should be transmitted to a remote system for human annotation and/or use in updating the machine learning model(s) of the robot. Embedding vector(s) representing such selected sensor data (e.g., representing common aspects across a population of sets of sensor data) could also be determined and transmitted to the robot. The robot could then determine embeddings for sensor data and, if the embeddings are similar enough to the transmitted embedding(s), the sensor data could be transmitted to the remote system for annotation and/or model updating.

26 Claims, 7 Drawing Sheets

400

402 Operate a robot to generate sensor data about an environment, to navigate within the environment, and to perform tasks in the environment 404 Determining, by a controller of the robot, that a first set of sensor data about the environment requires manual annotation, wherein determining that the first set of sensor data requires manual annotation comprises at least one of i) applying the first set of sensor data to a first model to generate (1) an output representation of the first set of sensor data and (2) an estimate of a confidence of the output and determining that the estimate of the confidence of the output is less than a threshold confidence, ii) determining that the robot has failed to perform a first task, wherein the first set of sensor data represents the environment during the performance of the first task or immediately after failure to perform the first task, or iii) determining that a first mode of sensor data within the first set of sensor data does not match a second mode of sensor data within the first set of sensor data 406 Responsive to determining that the first set of sensor data requires manual annotation, transmit, from a transmitter of the robot to a remote server, an indication of the first set of sensor data and an indication that the first set of sensor data requires manual annotation

Figure 4:
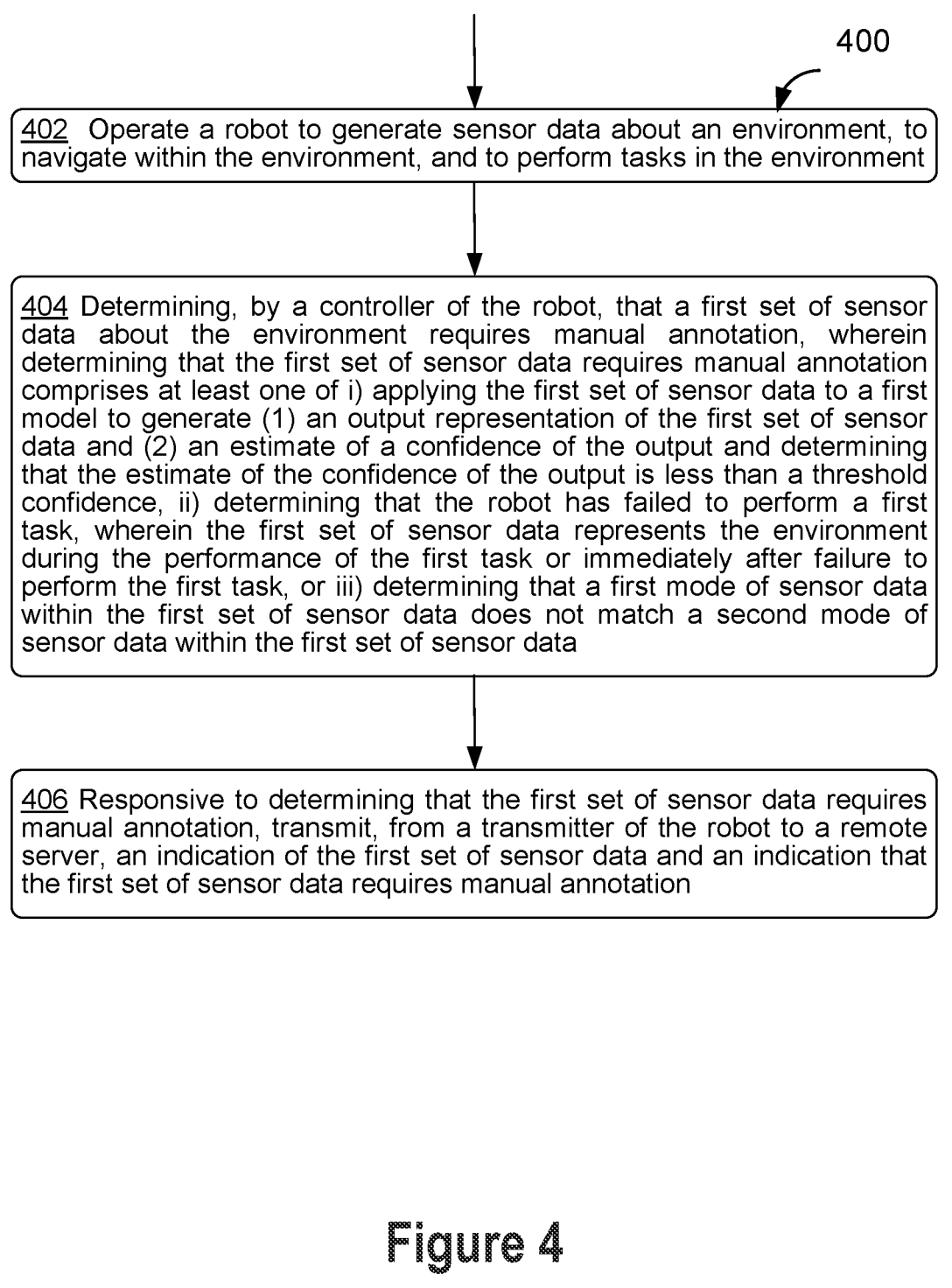

400

<u>402</u>  Operate a robot to generate sensor data about an environment, to navigate within the environment, and to perform tasks in the environment <u>404</u> Determining, by a controller of the robot, that a first set of sensor data about the environment requires manual annotation, wherein determining that the first set of sensor data requires manual annotation comprises at least one of i) applying the first set of sensor data to a first model to generate (1) an output representation of the first set of sensor data and (2) an estimate of a confidence of the output and determining that the estimate of the confidence of the output is less than a threshold confidence, ii) determining that the robot has failed to perform a first task, wherein the first set of sensor data represents the environment during the performance of the first task or immediately after failure to perform the first task, or iii) determining that a first mode of sensor data within the first set of sensor data does not match a second mode of sensor data within the first set of sensor data <u>406</u> Responsive to determining that the first set of sensor data requires manual annotation, transmit, from a transmitter of the robot to a remote server, an indication of the first set of sensor data and an indication that the first set of sensor data requires manual annotation

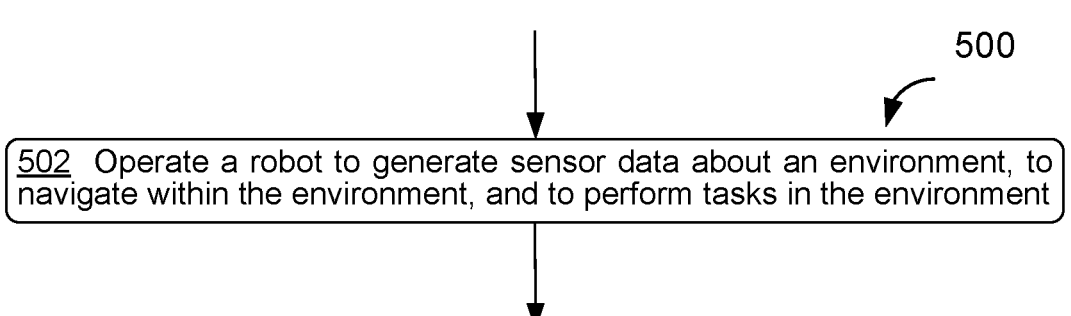

502  Operate a robot to generate sensor data about an environment, to navigate within the environment, and to perform tasks in the environment 504 Determining, by a controller of the robot, that a first set of sensor data about the environment requires manual annotation, wherein determining that the first set of sensor data requires manual annotation comprises applying the first set of sensor data to a first model to generate (1) an output representation of the first set of sensor data and (2) an estimate of a confidence of the output and determining that the estimate of the confidence of the output is less than a threshold confidence, wherein the first model is an object detection model that receives as an input an image and generates, as an output representation of the input image, a representation of the identity of objects at a plurality of locations within the input image, and wherein the first model generating the estimate of the confidence of the output comprises generating a respective confidence value for the identity of each of the objects at the plurality of locations, and wherein determining that the estimate of the confidence of the output is less than the threshold confidence comprises at least one of: (i) determining an average of the generated confidence values, (ii) determining a minimum of the generated confidence values, or (iii) determining a distribution of the generated confidence values 506 Responsive to determining that the first set of sensor data requires manual annotation, transmitting, from a transmitter of the robot to a remote server, an indication of the first set of sensor data and an indication that the first set of sensor data requires manual annotation

Figure 5

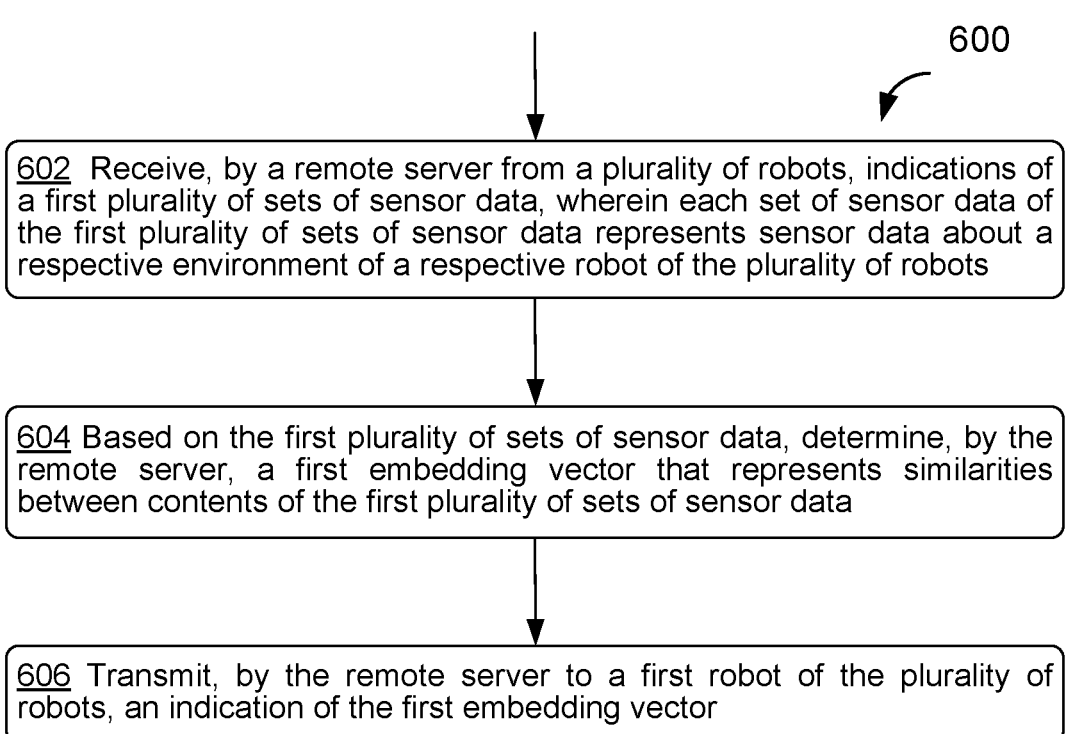

600

602 Receive, by a remote server from a plurality of robots, indications of a first plurality of sets of sensor data, wherein each set of sensor data of the first plurality of sets of sensor data represents sensor data about a respective environment of a respective robot of the plurality of robots 604 Based on the first plurality of sets of sensor data, determine, by the remote server, a first embedding vector that represents similarities between contents of the first plurality of sets of sensor data 606 Transmit, by the remote server to a first robot of the plurality of robots, an indication of the first embedding vector

Figure 6

ON-ROBOT DATA COLLECTION

CROSS-REFERENCE TO RELATED APPLICATION

This application claims priority to U.S. Provisional Patent Application No. 63/481,356, filed on Jan. 24, 2023, the contents of which are hereby incorporated by reference in their entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Adapting a robotic device to a particular task and/or environment can include collecting and processing (e.g., labeling using a human labelers or other processes) training data that can then be used to train and/or update models (e.g., vision models, haptic models, task performance models) used by the robot to perform the tasks, navigate the environment, etc.

SUMMARY

Example embodiments involve improved methods for obtaining and selectively requesting human annotation of training data (e.g., sensor inputs) used to train machine learning models used to control the operation of robots. It is difficult to obtain, retrieve, and/or optimally select from a larger raw dataset the large amounts of high-quality, relevant, non-redundant training data and associated labels necessary to train high-quality machine learning models used to operate robots (e.g., to operate robots to determine the geometry of an environment, to determine the location, pose, size, shape, or identity of objects in an environment, to identify that an environment contains a human being or animal). This is particularly true in examples wherein a 'generic' robot, operating using 'generic' machine learning models, is introduced into a novel environment and/or used to perform a novel task (e.g., involving a novel object) that was not represented in the training data used to train the 'generic' models. In such examples, the amount of additional environment- or task-specific training data may be particularly limited (e.g., related to the limited number and/or operational time of robots available).

The example embodiments herein include improved methods for selecting sensor data to be annotated and/or used to update machine learning models for a robot. These improved selection methods allow fewer, higher-quality sensor data sets to be used to train the robotic machine learning models, thereby reducing the cost of such training data (e.g., the financial cost of human annotation, the computational cost of training the machine learning model(s), the bandwidth and/or battery power cost of transmitting such sensor data to a central server from the robot(s)). These improved methods involve performing one or more filtering operations to determine whether to select a particular set of sensor data for transmission from a robot to a server or other remote system (e.g., for manual annotation and/or use to train an updated machine learning model). Such filtering operations could include determining whether there is 'disagreement' between sensor modalities represented in the sensor data (e.g., whether the location, identity, or other information about an object as determined based on a camera image does not match such information as determined based on a LIDAR point cloud). Such filtering operations could include determining that the robot has failed to perform a specified task. Such filtering operations could include determining that a confidence of one or more machine learning model outputs, as determined by the robot, are low-confidence (e.g., that a machine learning model has a low confidence with respect to the identity of an object in an environment, that a machine learning model has a low confidence with respect to whether an environment contains a human or some other classifier output). Such filtering operations could include determining that sensor data generated by the robot's sensors is sufficiently similar to previous sensor data that was manually annotated and/or used to update a machine learning model (e.g., an embedding of the newly-acquired sensor data is sufficiently similar to an embedding determined to represent a set of previously annotated sets of sensor data). In some examples, one or more robots could be operated to seek out sensor data that satisfies one or more of the selection filters above (e.g., to seek out sensor data sets that are similar, in an embedding space, to an embedding determined to represent a set of previously annotated sets of sensor data). This could be done to increase the amount of 'useful' input sensor data that is generated and that can then be used to update machine learning models of the robot(s).

In an embodiment, a method includes: (i) operating a robot to generate sensor data about an environment, to navigate within the environment, and to perform tasks in the environment; (ii) determining, by a controller of the robot, that a first set of sensor data about the environment requires manual annotation, wherein determining that the first set of sensor data requires manual annotation comprises at least one of (A) applying the first set of sensor data to a first model to generate (1) an output representation of the first set of sensor data and (2) an estimate of a confidence of the output and determining that the estimate of the confidence of the output is less than a threshold confidence, (B) determining that the robot has failed to perform a first task, wherein the first set of sensor data represents the environment during the performance of the first task or immediately after failure to perform the first task, or (C) determining that a first mode of sensor data within the first set of sensor data does not match a second mode of sensor data within the first set of sensor data; and (iii) responsive to determining that the first set of sensor data requires manual annotation, transmitting, from a transmitter of the robot to a remote server, an indication of the first set of sensor data and an indication that the first set of sensor data requires manual annotation.

In another embodiment, a method includes: (i) operating a robot to generate sensor data about an environment, to navigate within the environment, and to perform tasks in the environment; determining, by a controller of the robot, that a first set of sensor data about the environment requires manual annotation, wherein determining that the first set of sensor data requires manual annotation comprises applying the first set of sensor data to a first model to generate (1) an output representation of the first set of sensor data and (2) an estimate of a confidence of the output and determining that the estimate of the confidence of the output is less than a threshold confidence, wherein the first model is an object detection model that receives as an input an image and generates, as an output representation of the input image, a representation of the identity of objects at a plurality of locations within the input image, and wherein the first model generating the estimate of the confidence of the output comprises generating a respective confidence value for the identity of each of the objects at the plurality of locations, and wherein determining that the estimate of the confidence of the output is less than the threshold confidence comprises at least one of: (A) determining an average of the generated confidence values, (B) determining a minimum of the generated confidence values, or (C) determining a distribution of the generated confidence values; and (ii) responsive to determining that the first set of sensor data requires manual annotation, transmitting, from a transmitter of the robot to a remote server, an indication of the first set of sensor data and an indication that the first set of sensor data requires manual annotation.

In yet another embodiment, a method includes: (i) receiving, by a remote server from a plurality of robots, indications of a first plurality of sets of sensor data, wherein each set of sensor data of the first plurality of sets of sensor data represents sensor data about a respective environment of a respective robot of the plurality of robots; (ii) based on the first plurality of sets of sensor data, determining, by the remote server, a first embedding vector that represents similarities between contents of the first plurality of sets of sensor data; and (iii) transmitting, by the remote server to a first robot of the plurality of robots, an indication of the first embedding vector.

In a further embodiment, a non-transitory computer readable medium is provided which includes programming instructions executable by at least one processor to cause the at least one processor to perform functions. The functions include one or more of the above methods.

In a still further embodiment, a computing device comprising one or more processors is provided, the computing device configured to perform the one or more of the above methods. The computing device could be a mobile robotic system as described elsewhere herein.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 4 illustrates a block diagram of a method, in accordance with example embodiments.

FIG. 5 illustrates a block diagram of a method, in accordance with example embodiments.

FIG. 6 illustrates a block diagram of a method, in accordance with example embodiments.

DETAILED DESCRIPTION

Figure 1:
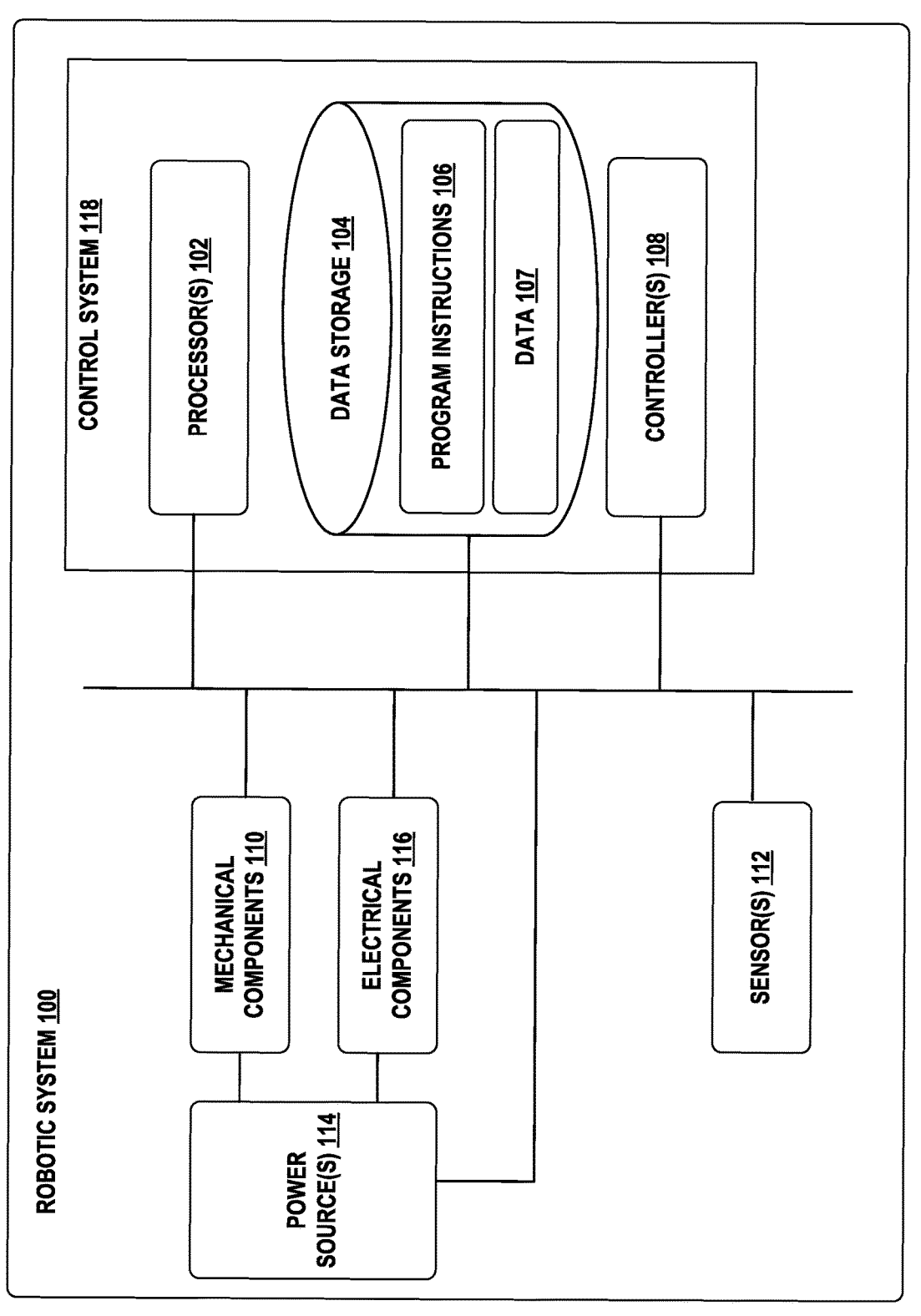
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A robotic device may use a variety of machine learning models in order to navigate an environment, perform tasks, or engage in other operations. Such models could include models that receive sensor data (e.g., camera images, depth maps, point clouds, effector poses/force feedback) and output information about the structure (e.g., the presence and location of obstacles, a pattern of navigable areas, the location of doors or other egress points) or contents (e.g., the location, pose, size, geometry, identity, or other information about discrete objects) of the environment. Information from such 'sensory' models can then be used to determine outputs of the robot (e.g., servo activations to pick up or otherwise interact with an object, motor activations to navigate to a target location). The determination of such outputs may, itself, include the use of further machine learning models and/or heuristic algorithms (e.g., heuristic algorithms coded by human beings and/or created by some other process).

The training of such models is generally done using large amounts of training data that represents environments, objects, tasks, or other things or concepts that are relevant to the potential operational objectives of such a robot. To provide higher-quality models, such training data may be annotated by a human (e.g., to facilitate supervised or semi-supervised learning of the machine learning models). Annotation can include a human indicating the identity, location, pose, or other information about an object that is represented in sensor data (e.g., an image, depth map, and/or other input data or combinations thereof), indicating whether an environment represented by sensor data contains a person, indicating whether a door represented by sensor data is open or closed, or other information about the state or contents of environments or objects represented in sensor data. In an example annotation process, a robotic device may collect two-dimensional (2D) image data using one or more RGB sensors. A human may be provided with a user interface in order to outline a bounding box where an object is situated and perhaps may label a property of the object, e.g., that the object inside the bounding box is a flower pot.

Machine learning models used by a robot may contain thousands to billions of trainable parameters. These trainable parameters may be adjusted based on the predictions that the model generates from sensor data inputs and provided labels corresponding to the sensor data inputs. With larger and larger models being developed for more accurate predictions, the amount of training data needed, and corresponding manually-generated annotations, also increases to facilitate generalization and discourage memorization by the model. However, accessing such training data (e.g., images, point clouds, etc. generated by a robot operating in an environment of interest and/or performing a task of interest) and associated label data (e.g., by presenting sensor data to a human and prompting them to identify contents of the sensor data or other information about an environment and/or objects represented by the sensor data) can be expensive or otherwise difficult to obtain. This difficulty can be related to a limited number of robots available to generate such data, a limited amount of time that such robots are able to operate to generate such data, a limited amount of human annotator time and/or number of human annotators available to provide annotations for sensor data, a financial cost of such human annotation, difficulty in extracting the most relevant and/or non-redundant data from a larger raw dataset (such data potentially being especially valuable in training for edge cases or other rare scenarios), or other factors making it difficult to obtain the amount, variety, and quality of sensor data and corresponding annotations necessary to train large, high-quality (e.g., accurate and generalizable) machine learning models for robot operation.

These issues are especially true in circumstances where robots are introduced to many unique environments, tasks, and/or objects of interest. For example, a model of generic robot, and a set of machine learning models thereof, could be intended for use in a variety of environments in order to perform a variety of tasks. The machine learning models of such a robot could be initially trained using 'generic' training data that represents 'generic' environments, tasks, and/or objects that are similar in some way to the specific environments, tasks, and/or objects that individual robots are likely to eventually be exposed to. Once a particular robot (or fleet of robots) is delivered to a particular environment and programmed to perform specific tasks (e.g., relating to specific objects in the specific environment), additional training data (e.g., sensor data) generated by the robot(s) can be obtained, and optionally manually annotated, and then used to update the 'generic' machine learning models to improve the performance of the robot(s) in the specific environment at the specific tasks. The number of robots, and the amount of robot operational time, available to generate additional environment- and/or task-specific sensor input training data is especially limited, while at the same time such environment- and/or task-specific sensor input training data is uniquely valuable in adapting the machine learning models to the specific environment and tasks of the specific robot(s). Selection, within such datasets, the most 'useful' data (e.g., with respect to relevance, non-redundancy, representation of difficult or rare scenarios) can lead to improved, quicker adaptation of pre-trained models to such new environments/tasks/objects/etc.

Methods and systems are provided herein to improve the manner in which such sensor data is obtained and selected for use in training and/or updating machine learning models (e.g., by having a human annotate one or more aspects of the sensor data to provide one or more labels therefor). This improved selection of sensor data sets for human annotation can reduce the cost of such human annotation and/or improve the quality of training obtainable within a specified amount of available human annotation time (e.g., by allocating the limited human annotation time toward sets of sensor data that are likely to be more valuable for training). This improved selection of sensor data sets for use in training and/or updating machine learning models can also improve the quality of such trained models by improving the quality of the sensor data sets used for such training and/or updating (e.g., by increasing the proportion of sensor data sets used for training that are likely to be more valuable for training, particularly in examples where the sensor data represents novel environments, tasks, and/or objects not represented in previously available training sensor data sets). This improved selection of sensor data sets for use in training and/or updating machine learning models can also reduce the computational cost of training such models by reducing the number of training sensor data sets needed to obtain a given degree of model accuracy, specificity, etc. relative to examples where training sensor data sets include more sets of sensor data that have not been obtained/selected as described herein and thus are likely to be, on average, less valuable for training.

Methods and systems provided herein also include operations that are performed on a robot (e.g., by one or more processors or other controller elements on the robot) in order to select and/or seek out sensor data for upload and annotation and/or use in updating machine learning models of the robot. In addition to the benefits described above, these on-robot operations provide benefits with respect to power and communications bandwidth use by the robot(s), which are limited in practice (e.g., due to limited battery and/or transmit bandwidth capacity of individual robots, due to limited communications network bandwidth capacity for a communications network that facilitates communication by one or more robots in an environment). These benefits are obtained by employing the methods described herein to select sets of sensor data for upload (e.g., for annotation prior to use in training and/or updating one or more machine learning models) that are more likely to be valuable for training. Accordingly, fewer such sets of sensor data can be uploaded while still obtaining similar benefits with respect to the quality of machine learning models trained using the uploaded sets of sensor data, thereby reducing the on-robot bandwidth and/or power costs of obtaining such machine learning models.

A variety of methods are provided herein for selecting particular sets of sensor data for manual annotation and/or use to train or update machine learning models. Such sets of sensor data can include associated sets of camera image(s), depth map(s), points cloud(s) (e.g., LIDAR point clouds), encoder maps or other information about the configuration or operation of a robot, gripper force feedback data or other end-of-arm-system sensor data, etc. The trained and/or updated models can then be pushed to the robot(s) that contributed the sets of sensor data in order to improve the operation of the robot(s) (e.g., to provide machine learning models that have been adapted to novel environment(s), task(s), and/or object(s) represented in the sensor data used to train/update the model(s)). The various selection methods described herein could be used individually or as a set of one or more of the selection methods. For example, one, several, or all of the selection methods described herein could be applied to a set of sensor data obtained by a robot (e.g., applied by an on-board controller of the robot) and the set of sensor data could be transmitted to a remote system (e.g., for manual annotation and/or use to train a machine learning model) if the set of sensor data satisfied one of the applied selection methods, all of the applied selection methods, more than a specified number N of the applied selection methods, etc.

The sensor data selection methods described herein can be conceptualized as representing the 'novelty' or 'difficulty' of an input set of sensor data. Such selection methods can be weighted toward 'likelihood of usefulness' with respect to training a machine learning model to represent aspects of a novel environment, task, and/or object. For example, a novel type of container or other object could be present in a warehouse in which robot(s) are operating, with the warehouse and the novel object having not been represented in training data used to train 'generic' machine learning models loaded onto the robot(s) prior to beginning operations in the warehouse. Accordingly, to improve training of updated model(s) adapted to the warehouse and the novel object, the selection methods described herein can be adapted to emphasize sets of sensor data that represent the novel object(s) and/or 'unfamiliar' aspects of the new warehouse environment.

A first selection method can be applied to sets of sensor data that include two or more 'modalities' of sensor data, e.g., to sets of sensor data that include two or more of images, depth maps, point clouds, end-of-arm-system sensor data, or other modalities of sensor data. The first selection method includes determining that a first mode of sensor data within a set of sensor data (e.g., a set of sensor data representing aspects of an environment during a particular period of time) does not match a second mode of sensor data within the first set of sensor data. The first and second modes could represent different measured physical aspects of an environment (e.g., intensity of light received at each pixel of a camera image, distances to material in an environment at each point in a point cloud) and/or the same or similar measured physical aspects measured by different sensors (e.g., the first mode is a first image generated by a first camera (e.g., a color camera) and the second mode is a second image generated by a second camera (e.g., an infrared camera, a camera of the same type as the first camera but located at a different location/perspective of the robot).

Determining that the first and second modes of sensor data within a particular set of sensor data do not match could include a variety of different processes. Where the first and second modes represent similar physical aspects of the environment (e.g., distance to material in the environment, as a depth map generated by a time-of-flight sensor, RGB-D camera, or other depth-detecting camera for the first mode and a point cloud generated by a LIDAR as the second mode), the first and second modes could be directly compared. For example, a sum-of-squared differences or some other measure of overall difference between two depth maps, or between a depth map and corresponding points of a depth cloud, could be determined and compared to a threshold to determine whether the first and second modes match.

In another example, the first and/or second modes of information could be used to generate representations of such similar physical aspects and then compared. For example, the first mode could be one or more camera images of an environment, and a depth map could be determined therefrom (e.g., by applying the image(s) to a trained machine learning model that outputs an estimated depth map therefrom) and then compared with a depth map, point cloud, or other information of or determined from the second mode. In another example, representative information could be determined from each mode and compared to determine whether the first and second modes match. For example, the location, size, pose, identity, and/or other information about objects or other material in the environment could be determined from the first and second modes of sensor data (e.g., from a camera image and from a point cloud) and correspondences between the information determined from the modes (e.g., the location of an object determined from a camera image and a location of material in the environment determined from a point cloud or depth map) could be calculated in order to determine whether the first and second modes of sensor data match.

A second selection method can include selecting sets of sensor data that are associated with failure of task(s) by a robot. This could include selecting sensor data sets taken proximate in time to the failure of the task(s), sensor data sets taken proximate in time to beginning the task(s), sensor data sets taken proximate in time to a time when the robot determined that the task(s) should be attempted, sensor data sets taken proximate in time to a time when the robot began interacting with a target of the task(s) (e.g., when the robot began interacting with a target object using an end-of-arm-system), or some other time relevant to the beginning, progression, or end of the failed task(s).

A third selection method can include applying a set of sensor data to a machine learning model (e.g., an object detection model, a person detection model, an open door detection model, a visual language model with a query (e.g., "did anything drop on the floor)) to generate both an output representation of the set of sensor data (e.g., an indication of the location, pose, size, identity, and/or other information about object(s) represented in the set of sensor data, an indication of whether a specified object is represented in the set of sensor data, an indication of whether a person is present and/or a door is open in the environment represented in the set of sensor data) and an estimate of a confidence of the generated output. The confidence could then be compared to a threshold confidence level and low-confidence sets of sensor data can be selected for transmission to a remote system (e.g., for annotation by a human operator and/or use in training/updating a machine learning model). The model(s) updated using sets of sensor data selected in this manner could include the model(s) used to generate the confidence values used to select the sets of sensor data. The estimate of a confidence of the generated output could be a 'direct' output of the model (e.g., an output of a 'confidence head' of the model) and/or determined based on the output representation of the set of sensor data (e.g., a margin score across a set of logits or other outputs corresponding to respective different classifier output values or classes).

Where the estimated confidence is a 'direct' output of the model, it can be directly compared to a threshold to determine whether to select the set of sensor data for uploading and/or annotation. Where multiple estimated confidences are 'direct' outputs of the model (e.g., confidences related to the identification of multiple objects in a scene), threshold(s) could be applied to each confidence and the set of sensor data selected if at least one of the confidences satisfies the threshold, if at least N of the confidences satisfy the threshold, if all of the confidences satisfy the threshold, etc. In examples wherein the robot is being operated in a novel environment that includes novel object(s) not represented in training data used to generate the initial model(s) used by the robot, one or more of the model outputs could represents such novel object(s) (e.g., that the novel object is present in the environment, that an identified object in the environment is an instance of the novel object).

Figures 7A, 7B, 7C:
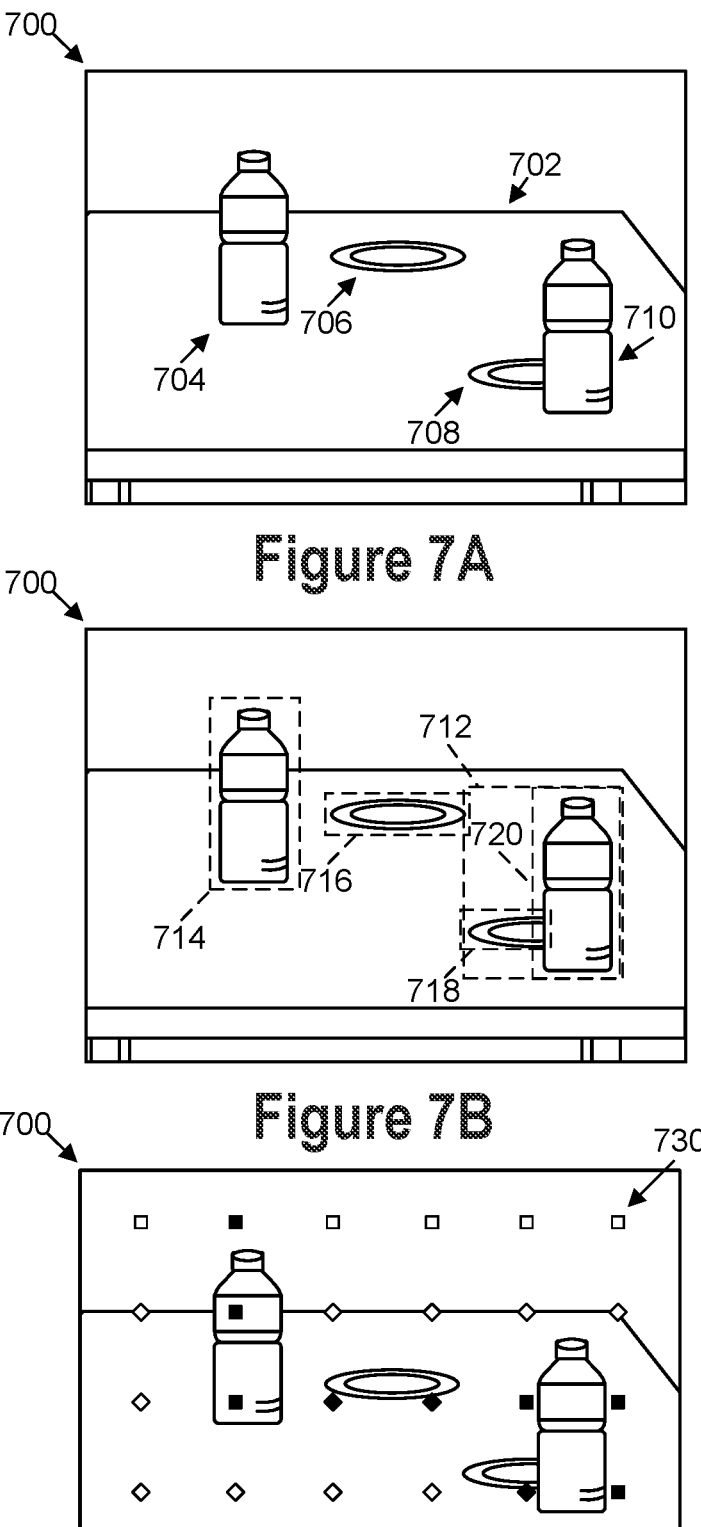
FIG. 7A illustrates an image of an environment, in accordance with example embodiments.
FIG. 7B illustrates an example output of an object detection model, as applied to the image of FIG. 7A, in accordance with example embodiments.
FIG. 7C illustrates an example output of an object segmentation model, as applied to the image of FIG. 7A, in accordance with example embodiments.

To assist in illustrating these and related concepts, FIG. 7A shows an example image 700 of an environment that could be generated by a robot in the environment. The image 700 depicts a table 702 and, located on the table 702, objects 704 (a bottle), 706 (a plate), 708 (another plate), and 710 (another bottle). Some of the objects may occlude others, e.g., as object 710 partially occludes object 708. The image 700 could be applied to a model as described herein to generate information that is representative of the contents of the image 700 and/or of the confidence of the model in the accuracy of that generated information. For example, the model could be an object detection model configured to determine whether one or more specified objects are represented in the image 700, to determine the location, shape, size, identity, state, or other information about objects represented in the image 700, to generate a segmentation map, depth map, or other regularly-spaced prediction of the contents of the image 700, a prediction of the three-dimensional geometry of the contents of the environment represented by the image 700 and/or a map of the environment that represents navigable areas of the environment, or some other representation of the contents of the image 700 and/or of the environment depicted therein.

FIG. 7B illustrates a plurality of boxes indicating the extent of discrete objects detected within the image. The boxes include boxes 714, 720 indicating the location and extent of the bottles 704, 710, boxes 716, 718 indicating the location and extent of the plates 706, 708, and an additional box 712 indicating the location and extent of a composite object that includes the bottle 710 and plate 708. In some examples, a model could output only the composite box 712 and not the individual boxes 718, 720, e.g., in examples where the model is not certain that there are two separate objects at that location within the image 700. Alternatively, such a model could accurately determine that two discrete objects (the plate 708 and bottle 710) are present in the image 700 and output the boxes 718, 720 accordingly. Such a model could additionally output, for each box, an indication of a confidence in the estimated box (e.g., a confidence in there being a discrete object represented in the box, of the location and/or extent of the box). Such boxes could be the output of a 'discrete object locating model' that is then provided to downstream models to identify any objects present in the boxes (e.g., to identify that the portion of the image 700 contained within the box 714 represents a bottle) and/or to determine other information about the image contents within such boxes (and optionally to output confidence estimates in such estimates). Additionally or alternatively, an object-specific model could output such boxes and/or representative information (e.g., centroids or other location data, heights, widths, or other size data) directly. E.g., a 'bottle locating model' could provide as outputs, based on the image 700 as an input, boxes 714, 720 indicating the location(s) of bottles in the input image 700.

FIG. 7C illustrates a plurality of squares/diamonds indicating a plurality of locations 730 within the image 700 at which a model has predicted the identity of objects represented in the image 700. The set of such predictions could be provided as, e.g., a segmentation map representing the contents of the image 700. As depicted in FIG. 7C, each location is associated with a predicted identity of object(s) at the location: an open square for 'no object,' an open diamond for 'table,' a filled square for 'bottle,' and a filled diamond for 'plate.' Such a model could, for each location, output a single class predictive of the identity of the object(s) at each location. Such a model could also, for each location, output a confidence in that predicted identity. Additionally or alternatively, such a model could, for each location, output a set of values (e.g., logits) for each class, of a set of enumerated classes, of item that the model is capable of identifying (e.g., plate, bottle, table, etc.). The output object identification of such a model could be determined, e.g., as the class of the maximum-valued output value. The confidence of such a model could be determined from such a set of outputs (e.g., as a margin value across the logits, as a probability or likelihood of the selected, maximum value, as an average, variance, or other distributional variable of the set of outputs).

In some examples, a model could have a plurality of classifier outputs, each corresponding to a respective object (e.g., to the likelihood that the environment contains at least one instance of the respective object, that an identified object in the environment is an instance of the respective object), with one or more such classifier outputs corresponding to one or more novel objects that may be present in the environment. For example, such a model could have an output representing whether an input image contains at least one bottle, at least one plate, and/or at least one table. Accurate outputs of such a model, when presented with the image 700, would all indicate 'true,' since image 700 depicts an environment containing all of those objects. In another example, a portion of the image 700 could be selected, that corresponds to the extent of an identified object in the image 700 (e.g., the portion of the image 700 within box 714), and presented to such a classifier model (and an accurate 'bottle' output of such a model, when presented with the image contents of box 714, would indicate 'true').

In such examples, selecting a set of sensor data for uploading and/or annotation can include comparing the confidence value(s) corresponding to the novel object(s) to a threshold and, if one (or more) of the confidence value(s) corresponding to the novel object(s) fails to meet the threshold (indicating that the model has sub-threshold confidence in the identity or presence of the novel object(s)), then the set of sensor data can be uploaded and/or annotated. For example, if the 'bottles' of FIG. 7A are such a type of novel object, then the classifier output(s) corresponding to whether the image 700 or a portion thereof (a box indicating the location and extent of a detected discrete object within the image 700, a tile or other regularly-spaced segment of the image 700) represents a 'bottle' could be compared to the threshold and, if the confidence that the image 700 and/or a portion thereof does not meet the threshold, the image 700 and/or a portion thereof could be uploaded and/or annotated. This can be done to 'emphasize' sets of training data that represent the novel object(s), which are likely to be particularly valuable in training and/or updating machine learning models to accurately detect and/or identify the novel object(s) in sensor data.

As noted above, the confidence estimate determined for a particular model output could be a 'direct' output of the model itself. Additionally or alternatively, such confidence estimates could be determined from the model output(s) representing of the set of sensor data. For example, the outputs of the model could include a plurality of classifier outputs (e.g., respective values representing the relative likelihood that each of a number of enumerated types of objects are present in the environment represented by the sensor data). In such an example, the confidence in the model output could be determined based on the classifier output values, e.g., as a margin score across the classifier output values.

In some examples, the confidence estimate for the model output could be a weighted average across the classifier outputs and/or across different object detection models (e.g., a weighted margin score, or a weighted average of confidence outputs generated as 'direct' outputs of the model corresponding to each of the classifier outputs). Such a weighting could then be updated over time based on the model's overall ability to accurately generate such classifier outputs (e.g., to accurately estimate whether each object in an enumerated set of objects is actually present in an environment based on input sensor data). Thus, over time, the overall confidence estimate for the model output (which is used to determine whether to select the input set of sensor data for uploading and/or annotation) could be weighted to emphasize classes (e.g., object types) for which the model performs poorly (e.g., due to intrinsically greater difficulty in detecting or classifying such objects, due to relatively rarer incidence of such objects in the environment of the robot). For example, the weighting for model outputs corresponding to whether a 'bottle' is present in an image (e.g., 700) or a portion thereof (e.g., a box 712, 714, etc., at one or more of the locations 730) could be higher to begin with, and then decrease over time. Accordingly, machine learning models trained/updated using sets of sensor data selected in this manner can be made better (e.g., more accurate) using fewer sets of sensor data, thus saving computational cost of such training and reducing the on-robot power cost and communications bandwidth cost of transmitting such sets of sensor data to a remote system for use in such model training/updating.

As noted above, the model could be an object detection model. Such a model could output the identity or other information about one or more objects in an environment based on sensor data representing the environment. This could include providing outputs indicative of whether or not at least one instance of an object is present in the environment, for one or more types of objects. Additionally or alternatively, the model(s) could provide a number of outputs representative of the identity of multiple different objects at a plurality of different locations within the environment. In a first example, a first object detection model could output the locations, within the environment, of a plurality of different objects (e.g., as boxes 712, 714, 716, 718, and/or 720), and then a second object detection model could be applied to portions of the sensor data representing the locations of the plurality of different objects in order to identify the object at each of the locations. In a second example, the object detection model could provide outputs indicative of the identity of possible objects at a pre-specified set of locations (e.g., 730) within the environment (e.g., a regularly spaced set of locations across a camera image of the environment).

Where multiple object identity outputs are generated for respective locations within the environment, an overall confidence in the model outputs could be determined and used to select whether to select the corresponding input set of sensor data for uploading and/or annotation. This could include determining an average of confidence values generated for each output, determining a minimum confidence value across the confidence values generated for each output, or determining a distribution of the confidence values generated for each output. Such a determination could be determined for each output separately. For example, the average, minimum, distribution, etc. of the confidence of outputs corresponding to whether each location, identified object, etc. in an image represents a 'bottle' or other specified class of output could be compared to a 'bottle' threshold, and such a determination could optionally also be performed for additional classes of outputs (e.g., plates, tables). Additionally or alternatively, such a confidence determination could be performed across such outputs, e.g., by determining a margin score for each location (e.g., 730) and/or discrete object (e.g., at box(es) 712, 720, etc.) within an image or other set of sensor data. A weighting used to determine such an across-output confidence-related score could be updated over time to emphasize classes (e.g., object types) for which the model performs poorly (e.g., due to intrinsically greater difficulty in detecting or classifying such objects, due to relatively rarer incidence of such objects in the environment of the robot).

Additionally or alternatively, the aspect of a population of confidence values (e.g., minimum, mean, median, variance determined across, e.g., pixels, identified discrete objects, classifier outputs, different object detection models) used to determine whether to upload/annotate a set of sensor data. This could be done, e.g., based on evaluation of the relative merits of the use of two (or more) such confidence summarization methods to select sets of sensor data for annotation/use in updating models (e.g., based on the relative improvements in the model(s) observed when training using sets of sensor data selected using the various different methods). For example, during a first period of time, a first confidence summarization method (e.g., a minimum confidence) could be used to determine, based on sets of confidence values determined from input sets of sensor data, whether to upload/annotate the sets of sensor data (e.g., by comparing a minimum confidence of a set of confidence values determined for a plurality of locations within an image, or for a plurality of discrete objects within the image). A first benefit value with respect to improvements in the model(s) derived from sets of sensor data selected using the first confidence summarization method could then be determined. Then, during a second period of time, a second confidence summarization method (e.g., a mean confidence) could be used to determine, based on sets of confidence values determined from input sets of sensor data, whether to upload/annotate the sets of sensor data (e.g., by comparing a mean of a set of confidence values determined for a plurality of locations within an image, or for a plurality of discrete objects within the image). A second benefit value with respect to improvements in the model(s) derived from sets of sensor data selected using the second confidence summarization method could be determined. Then, based on the first and second benefit values, a confidence summarization method (e.g., the first or second method) could be selected and used to select subsequent sets of sensor data for upload/annotation.

Additionally or alternatively, first and second (or more) confidence summarization methods could be used by first and second (or more) robots to select sets of sensor data for upload/annotation, and first and second (or more) benefit values with respect to improvements in the model(s) derived from sets of sensor data uploaded/annotated in response to selection, by processors of the first and second robots using the first and second methods, respectively. A selected confidence summarization method (from the first, second, or additional methods) could then be chosen based on the benefit values and used by the first, second, and/or additional robots to summarize confidence values in order to use the summarized confidence values to select subsequently obtained sets of sensor data for upload/annotation.

A set of sensor data could then be selected for uploading/annotation based on one or more such single-class or across-classes confidence values. For example, if a minimum confidence (e.g., with respect to a single class of object, with respect to a margin score or other score determined across a set of object classes), an average confidence, a distribution of confidences, etc. across all locations/discrete objects in an image is less than a threshold level, the image and/or related sensor data could be uploaded and/or annotated for use in training model updates.

Once one or more sets of sensor data have been selected (e.g., by one or more processors or other controller systems of a robot using one or more of the methods described herein), the set(s) of sensor data can be transmitted from the robot(s) to a remote system for use in training and/or updating machine learning models (e.g., training/updating machine learning models used by the robot(s) that transmitted the set(s) of sensor data). This could include the robot(s) transmitting the set(s) of sensor data along with associated request(s) that the transmitted sensor data be annotated by a human (e.g., to verify classifier outputs or other model outputs that were generated by the robot that had low confidence, that did not match between modes of sensor input, whose misclassification may have been relevant to failure of a task). Such human annotation could include correcting or confirming an identity, location, pose, or other model-estimated property of an object, correcting or confirming a classifier output (e.g., whether and environment represented by a set of sensor data contains a person, whether a door was open, an identity of an object), adding new output classes to a classifier (e.g., adding a novel class, representing a novel object or type of object, to an enumerated set of output classes of a model), or providing some other annotation to the set(s) of sensor data that can then be used to train and/or update machine learning models.

Once sufficient sets of sensor data have been transmitted and/or annotated in this manner, the sets of sensor data can then be used to train and/or update one or more machine learning models. These machine learning models could then be transmitted to one or more robots (e.g., to the robots that transmitted the sets of sensor data used to generate and/or update the machine learning models) to improve the operation of the robots (e.g., to improve the detection, identification, and/or location estimation of one or more objects). The sensor data could be transmitted from a fleet of robots, and the models generated based on the sensor data could then be transmitted to robots within the contributing fleet and/or to additional robots. This could include using sensor data from robots at a plurality of different locations to update a 'generic' model that may be provided to robots introduced into novel environments/tasks/objects for which previous training sensor data sets have not yet been acquired. This 'generic' model could then be further trained/updated based on sets of sensor data from a specific environment or task (e.g., sensor data from robots at a specific warehouse) to generate a 'specific' model that is especially adapted to the specific environment or task and that can be transmitted to robots in the specific environment/performing the specific task (e.g., to the robots at the specific warehouse).

Sets of uploaded sensor data can also be used to determine whether future sets of sensor data obtained by robot(s) should be uploaded for annotation and/or use in training/updating machine learning models. If a robot obtains a set of sensor data that is similar in some way to a previously obtained set of sensor data (obtained by the robot itself, or by another robot) that was selected for uploading and/or annotation (e.g., due to being associated with failure of a task), the newly-obtained set of sensor data could be uploaded and/or annotated. This variety of sensor data selection could further improve the training of machine learning models by allowing additional training data that may represent 'difficult' environments to be obtained and/or selected for use in training/updating machine learning models.

Determining that a newly obtained set of sensor data is similar to one or more previously-selected sets of sensor data could include determining embedding vectors that represent the newly-obtained set of sensor data and the previously-selected set(s) of sensor data in a relatively lower-dimensional space. This could include applying the sets of sensor data to a machine learning model to generate the embedding vectors. A degree of similarity between the embedding vectors could then be determined (e.g., an L1 or L2 distance between the embedding vectors) and, if the similarity exceeds a threshold, the newly-obtained set of sensor data could be transmitted to a remote system (along with, e.g., a request for human annotation of the set of sensor data) for use in generating improved machine learning models.

The embedding vectors for a newly-obtained set of sensor data could be compared to individual embedding vectors for a plurality of individual previously-selected sets of sensor data. Additionally or alternatively, one or more embedding vectors could be determined to represent a plurality of previously-selected sets of sensor data, e.g., to represent common aspects or features of a group of previously-selected sets of sensor data. This could be done to reduce the computational cost of performing such embedding vector comparisons by allowing the embedding vector for a newly-obtained set of sensor data to be compared to a smaller number of embedding vector(s) (e.g., only one embedding vector) that represents a group of previously-selected sets of sensor data. Such embedding vector(s) could then be transmitted to one or more robots for use as described above in selecting newly-obtained sets of sensor data that are similar to the previously-obtained sets of sensor data.

Such an embedding vector could be generated by applying a clustering algorithm to the previously-selected sets of sensor data and/or to the embedding vectors determined therefor. In some examples, a machine learning model or other mapping used to generate the embedding vectors could be trained, based on a plurality of previously-selected sets of sensor data, to generate embedding vectors therefor that exhibit clustering and/or that represent common aspects within the plurality of previously-selected sets of sensor data. Such a machine learning model could then be transmitted to one or more robots to allow those robots to generate embedding vectors for newly-obtained sets of sensor data.

Such embedding vectors could also be used in other ways to improve the generation and/or selection of sets of training data for use in generating improved machine learning models. For example, one or more robots could operate to seek out sensory information that corresponds to embedding vectors that are similar to the embedding vector(s) of previously-selected sets of sensor data. This could be done to increase the rate at which useful sets of sensor data are obtained. Such robots could perform such exploration in addition to other tasks.

In another example, such embedding vectors could be used to 'mine' stored sets of previously-obtained sensor data. For example, embedding vectors could be determined for sets of sensor data that are stored in a database (e.g., that were previously obtained by one or more robots and then stored for future use). The determined embedding vectors could then be compared to the embedding vector(s) of previously-selected sets of sensor data (e.g., by determine L1 or L2 distances therebetween). Sets of sensor data in the database whose embedding vectors are sufficiently similar (e.g., more similar than a threshold level) to one or more of the bedding vector(s) of previously-selected sets of sensor data could themselves be selected for human annotation and/or use in training and/or updating machine learning models. The machine learning models generated based on such selected database-stored sets of sensor data could then be transmitted to one or more robots to improve their operation.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
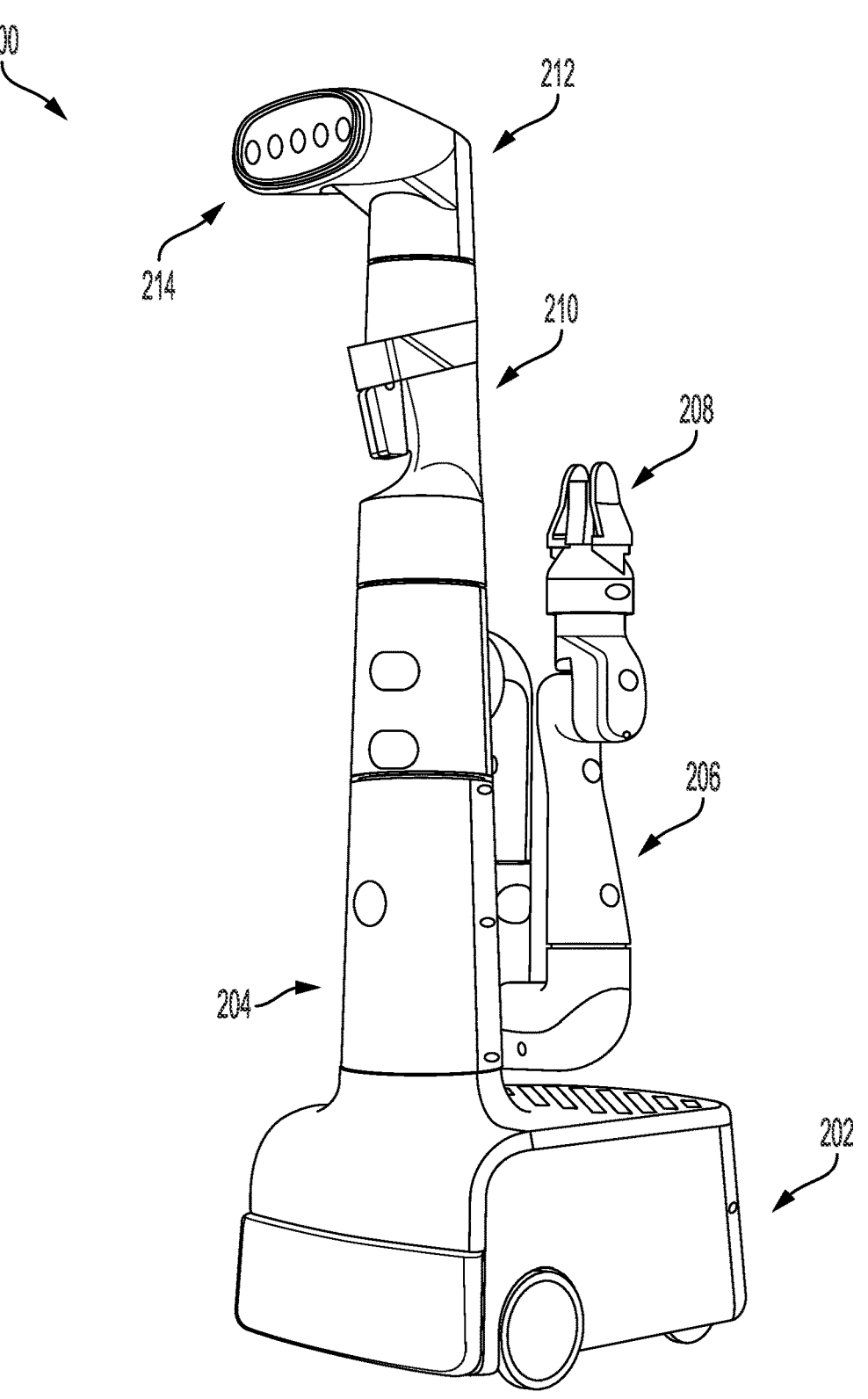
FIG. 2 illustrates a mobile robot, in accordance with example embodiments.
Figure 3:
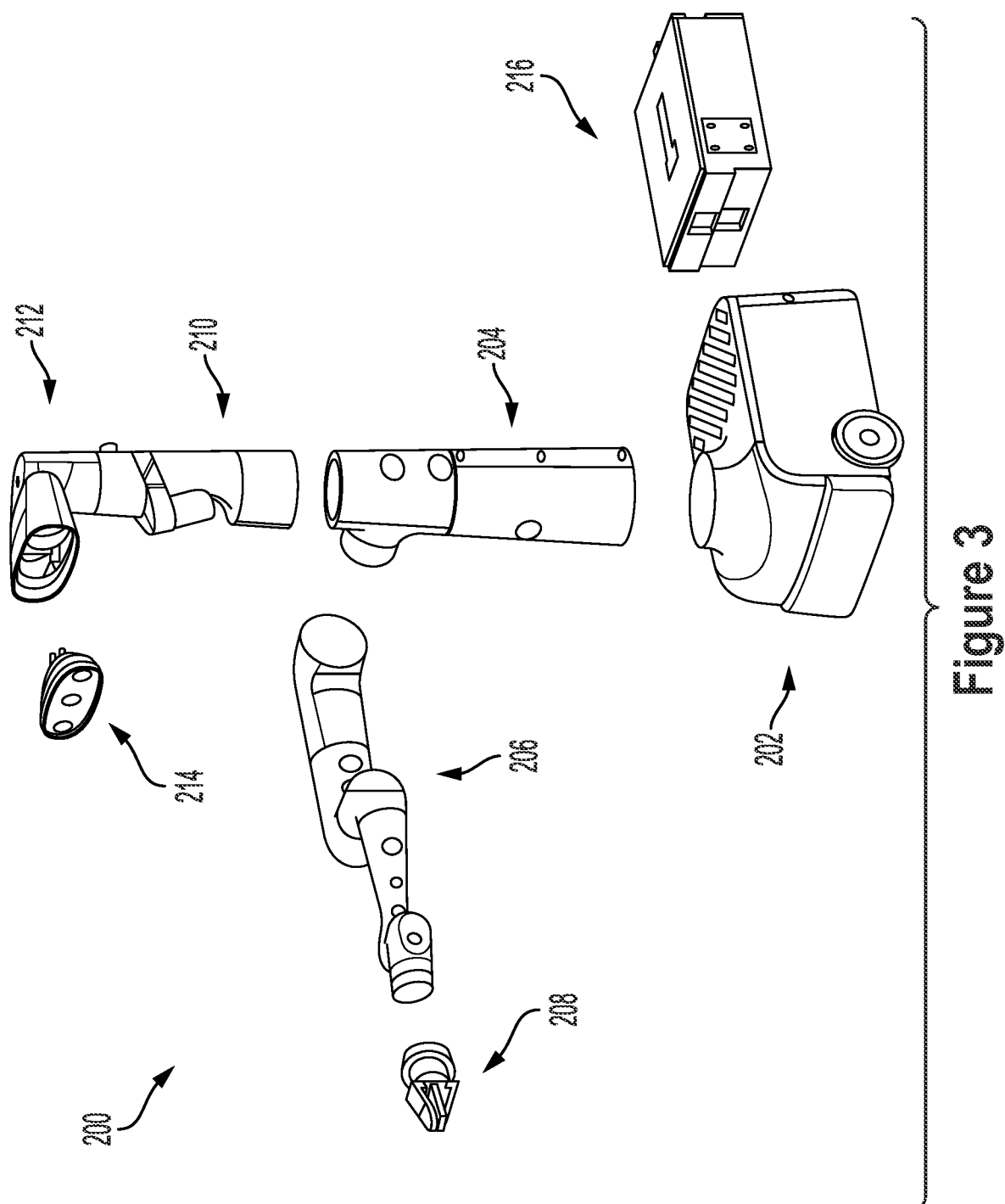
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

III. Example Methods

FIGS. 4, 5, and 6 are a block diagrams of respective method, in accordance with example embodiments. In some examples, methods 400, 500, and/or 600 of FIGS. 4, 5, and 6 may be carried out by a control system, such as control system 118 of robotic system 100. In further examples, methods 400, 500, and/or 600 of FIGS. 4, 5, and 6 may be carried out in whole or in part by a computing device or a server device remote from the robotic device. In still further examples, methods 400, 500, and/or 600 may be carried out by one or more processors, such as processor(s) 102, executing program instructions, such as program instructions 106, stored in a data storage, such as data storage 104. Execution of methods 400, 500, and/or 600 may involve a robotic device, such as the robotic device illustrated and described with respect to FIGS. 1-3. Further, execution of methods 400, 500, and/or 600 may involve a computing device or a server device remote from the robotic device and robotic system 100. Other robotic devices may also be used in the performance of methods 400, 500, and/or 600. In further examples, some or all of the blocks of methods 400, 500, and/or 600 may be performed by a control system remote from the robotic device. In yet further examples, different blocks of methods 400, 500, and/or 600 may be performed by different control systems, located on and/or remote from a robotic device.

At block 402, method 400 includes operating a robot to generate sensor data about an environment, to navigate within the environment, and to perform tasks in the environment. At block 404, method 400 includes determining, by a controller of the robot, that a first set of sensor data about the environment requires manual annotation, wherein determining that the first set of sensor data requires manual annotation comprises at least one of i) applying the first set of sensor data to a first model to generate (1) an output representation of the first set of sensor data and (2) an estimate of a confidence of the output and determining that the estimate of the confidence of the output is less than a threshold confidence, ii) determining that the robot has failed to perform a first task, wherein the first set of sensor data represents the environment during the performance of the first task or immediately after failure to perform the first task, or iii) determining that a first mode of sensor data within the first set of sensor data does not match a second mode of sensor data within the first set of sensor data. At block 406, method 400 includes, responsive to determining that the first set of sensor data requires manual annotation, transmitting, from a transmitter of the robot to a remote server, an indication of the first set of sensor data and an indication that the first set of sensor data requires manual annotation. Method 400 could include additional or alternative steps or elements.

At block 502, method 500 includes operating a robot to generate sensor data about an environment, to navigate within the environment, and to perform tasks in the environment. At block 504, method 500 includes determining, by a controller of the robot, that a first set of sensor data about the environment requires manual annotation, wherein determining that the first set of sensor data requires manual annotation comprises applying the first set of sensor data to a first model to generate (1) an output representation of the first set of sensor data and (2) an estimate of a confidence of the output and determining that the estimate of the confidence of the output is less than a threshold confidence, wherein the first model is an object detection model that receives as an input an image and generates, as an output representation of the input image, a representation of the identity of objects at a plurality of locations within the input image, and wherein the first model generating the estimate of the confidence of the output comprises generating a respective confidence value for the identity of each of the objects at the plurality of locations, and wherein determining that the estimate of the confidence of the output is less than the threshold confidence comprises at least one of: (i) determining an average of the generated confidence values, (ii) determining a minimum of the generated confidence values, or (iii) determining a distribution of the generated confidence values. At block 506, method 500 includes, responsive to determining that the first set of sensor data requires manual annotation, transmitting, from a transmitter of the robot to a remote server, an indication of the first set of sensor data and an indication that the first set of sensor data requires manual annotation.

At block 602, method 600 includes receiving, by a remote server from a plurality of robots, indications of a first plurality of sets of sensor data, wherein each set of sensor data of the first plurality of sets of sensor data represents sensor data about a respective environment of a respective robot of the plurality of robots. At block 604, method 600 includes, based on the first plurality of sets of sensor data, determining, by the remote server, a first embedding vector that represents similarities between contents of the first plurality of sets of sensor data. At block 606, method 600 includes transmitting, by the remote server to a first robot of the plurality of robots, an indication of the first embedding vector.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
operating a robot to generate sensor data about an environment, to navigate within the environment, and to perform tasks in the environment;
determining, by a controller of the robot, that a first set of sensor data about the environment requires manual annotation, wherein determining that the first set of sensor data requires manual annotation comprises at least one of i) applying the first set of sensor data to a first model to generate (1) an output representation of the first set of sensor data and (2) an estimate of a confidence of the output and determining that the estimate of the confidence of the output is less than a threshold confidence, ii) determining that the robot has failed to perform a first task, wherein the first set of sensor data represents the environment during the performance of the first task or immediately after failure to perform the first task, or iii) determining that a first mode of sensor data within the first set of sensor data does not match a second mode of sensor data within the first set of sensor data; and
responsive to determining that the first set of sensor data requires manual annotation, transmitting, from a transmitter of the robot to a remote server, an indication of the first set of sensor data and an indication that the first set of sensor data requires manual annotation.

2. The method of claim 1, further comprising:
determining, by the controller of the robot, that a second set of sensor data about the environment requires manual annotation, wherein determining that the second set of sensor data requires manual annotation comprises applying the second set of sensor data to the first model to generates an output representation of the second set of sensor data and an estimate of a confidence of the output and determining that the estimate of the confidence of the output is less than the threshold confidence;
determining, by the controller of the robot, that a third set of sensor data about the environment requires manual annotation, wherein determining that the third set of sensor data requires manual annotation comprises determining that the robot has failed to perform a second task, wherein the third set of sensor data represents the environment during the performance of the second task or immediately after failure to perform the second task; and
determining, by a controller of the robot, that a fourth set of sensor data about the environment requires manual annotation, wherein determining that the fourth set of sensor data requires manual annotation comprises determining that a first mode of sensor data within the fourth set of sensor data does not match a second mode of sensor data within the fourth set of sensor data.

3. The method of claim 1, wherein determining that the first set of sensor data requires manual annotation comprises determining that the first mode of sensor data within the first set of sensor data does not match the second mode of sensor data within the first set of sensor data.

4. The method of claim 3, wherein the first mode of sensor data within the first set of sensor data is image data and wherein the second mode of sensor data within the first set of sensor data is depth data.

5. The method of claim 4, further comprising:
operating a camera to generate the image data; and
operating a LIDAR sensor to generate the depth data.

6. The method of claim 3, wherein the first mode of sensor data within the first set of sensor data is first depth data and wherein the second mode of sensor data within the first set of sensor data is second depth data, and wherein the method further comprises:

operating a red green blue depth (RGB-D) camera to generate the first depth data; and operating a LIDAR sensor to generate the second depth data.

7. The method of claim 1, wherein determining that the first set of sensor data requires manual annotation comprises determining that the robot has failed to perform the task, wherein the first set of sensor data represents the environment during the performance of the task or immediately after failure of the task.

8. The method of claim 1, wherein determining that the first set of sensor data requires manual annotation comprises applying the first set of sensor data to the first model to generate (1) the output representation of the first set of sensor data and (2) the estimate of a confidence of the output and determining that the estimate of the confidence of the output is less than the threshold confidence.

9. The method of claim 8, wherein the first model is an object detection model that receives as an input an image and generates, as an output representation of the input image, a representation of the identity and location of at least one object within the input image, and wherein the first model generating the estimate of the confidence of the output comprises generating a confidence in the identity of the at least one object.

10. The method of claim 8, wherein the first model is an object detection model that receives as an input an image and generates, as an output representation of the input image, a representation of the identity of objects at a plurality of locations within the input image, and wherein the first model generating the estimate of the confidence of the output comprises generating a respective confidence value for the identity of each of the objects at the plurality of locations, and wherein determining that the estimate of the confidence of the output is less than the threshold confidence comprises at least one of: (i) determining an average of the generated confidence values, (ii) determining a minimum of the generated confidence values, or (iii) determining a distribution of the generated confidence values.

11. The method of claim 8, wherein the first model is a classification model that receives as an input an image and generates, as an output representation of the input image, a classifier output representing the input image, and wherein the first model generating the estimate of the confidence of the output comprises generating a confidence in the classifier output.

12. The method of claim 11, wherein the first model generates a classifier output representing at least one of: (i) whether a room is vacant, (ii) whether a door is open, or (iii) whether a specified object is present.

13. The method of claim 11, wherein generating the estimate of the confidence of the output comprises generating a margin score for the classifier output.

14. The method of claim 11, wherein generating the estimate of the confidence of the output comprises generating a confidence value for each possible classifier output of an enumerated set of classifier outputs and determining a weighted average of the confidence values for each possible classifier output.

15. The method of claim 11, wherein the first model is a classification model that receives as an input an image and generates, as an output representation of the input image, a classifier output representing an identity of an object in the input image, wherein the classifier output representing an identity of an object in the input image can assume a value selected from an enumerated set of possible classifier output values corresponding to respective different object identities, and wherein the first model generating the estimate of the confidence of the output comprises generating a confidence in the classifier output with respect to a particular novel object identity within the set of respective different object identities.

16. The method of claim 1, further comprising:

presenting, via a user interface in response to the transmitter of the robot transmitting the indication of the first set of sensor data and the indication that the first set of sensor data requires manual annotation to the remote server, an indication of at least a portion of the first set of sensor data;

receiving, via the user interface, an indication of an annotation of the first set of sensor data; and based on the first set of sensor data and the indication of an annotation of the first set of sensor data, generating a second model.

17. The method of claim 16, further comprising:

transmitting, to the robot, an indication of the second model; and operating, by the controller of the robot using the second model, the robot to generate sensor data about the environment, to navigate within the environment, and to perform tasks in the environment.

18. The method of claim 1, further comprising:

receiving, by the remote server from one or more robots, indications of a first plurality of additional sets of sensor data;

based on the first set of sensor data and the first plurality of additional sets of sensor data, determining, by the remote server, a first embedding vector that represents similarities between contents of the first set of sensor data and the contents of the first plurality of additional sets of sensor data.

19. The method of claim 18, further comprising:

transmitting, to the robot, an indication of the first embedding vector;

generating, by the controller of the robot, a fifth set of sensor data about the environment;

mapping, by the controller of the robot, the fifth set of sensor data to a second embedding vector that represents contents of the fifth set of sensor data;

determining, by the controller of the robot, that a similarity between the first embedding vector and the second embedding vector is greater than a threshold similarity; and responsive to determining that the similarity between the first embedding vector and the second embedding vector is greater than the threshold similarity, transmitting, from the transmitter of the robot to the remote server, an indication of the fifth set of sensor data and an indication that the fifth set of sensor data requires manual annotation.

20. The method of claim 18, further comprising:

transmitting, to an additional robot, an indication of the first embedding vector;

generating, by a controller of the additional robot, a sixth set of sensor data about an environment of the additional robot;

mapping, by the controller of the additional robot, the sixth set of sensor data to a third embedding vector that represents contents of the sixth set of sensor data;

determining, by the controller of the additional robot, that a similarity between the first embedding vector and the third embedding vector is greater than a threshold similarity; and responsive to determining that the similarity between the first embedding vector and the third embedding vector is greater than the threshold similarity, transmitting, from a transmitter of the additional robot to the remote server, an indication of the sixth set of sensor data and an indication that the sixth set of sensor data requires manual annotation.

21. The method of claim 18, further comprising:

transmitting, to an additional robot, an indication of the first embedding vector;

operating, by a controller of the additional robot, the additional robot to navigate within an environment of the additional robot to seek out sensor data about the environment that, when mapped to an embedding vector, generates an embedding vector similar to the first embedding vector.

22. The method of claim 18, further comprising:

obtaining, from a database by the remote server, a stored second plurality of additional sets of sensor data;

mapping each set of sensor data of the second plurality of additional sets of sensor data to a respective embedding vector of a plurality of embedding vectors;

identifying a subset of the second plurality of additional sets of sensor data having embedding vectors of the plurality of embedding vectors that exhibit a similarity to the first embedding vector that is greater than a threshold similarity; and based on the identified subset of the second plurality of additional sets of sensor data, generating a third model.

23. The method of claim 22, further comprising:

transmitting, to the robot, an indication of the third model; and operating, by the controller of the robot using the third model, the robot to generate sensor data about the environment, to navigate within the environment, and to perform tasks in the environment.

24. The method of claim 22, further comprising:

presenting, via a user interface, an indication of at least a portion of the second plurality of additional sets of sensor data; and receiving, via the user interface, an indication of an annotation of at least one set of sensor data of the second plurality of additional sets of sensor data, wherein generating the third model is additionally based on the indication of the annotation of at least one set of sensor data of the second plurality of additional sets of sensor data.

25. A system comprising:

a computing device comprising one or more processors, the computing device configured to perform a method comprising:

operating a robot to generate sensor data about an environment, to navigate within the environment, and to perform tasks in the environment;

determining, by a controller of the robot, that a first set of sensor data about the environment requires manual annotation, wherein determining that the first set of sensor data requires manual annotation comprises at least one of i) applying the first set of sensor data to a first model to generate (1) an output representation of the first set of sensor data and (2) an estimate of a confidence of the output and determining that the estimate of the confidence of the output is less than a threshold confidence, ii) determining that the robot has failed to perform a first task, wherein the first set of sensor data represents the environment during the performance of the first task or immediately after failure to perform the first task, or iii) determining that a first mode of sensor data within the first set of sensor data does not match a second mode of sensor data within the first set of sensor data; and responsive to determining that the first set of sensor data requires manual annotation, transmitting, from a transmitter of the robot to a remote server, an indication of the first set of sensor data and an indication that the first set of sensor data requires manual annotation.

26. A non-transitory computer readable medium comprising program instructions executable by at least one processor to cause the at least one processor to perform a method comprising:

operating a robot to generate sensor data about an environment, to navigate within the environment, and to perform tasks in the environment;

determining, by a controller of the robot, that a first set of sensor data about the environment requires manual annotation, wherein determining that the first set of sensor data requires manual annotation comprises at least one of i) applying the first set of sensor data to a first model to generate (1) an output representation of the first set of sensor data and (2) an estimate of a confidence of the output and determining that the estimate of the confidence of the output is less than a threshold confidence, ii) determining that the robot has failed to perform a first task, wherein the first set of sensor data represents the environment during the performance of the first task or immediately after failure to perform the first task, or iii) determining that a first mode of sensor data within the first set of sensor data does not match a second mode of sensor data within the first set of sensor data; and responsive to determining that the first set of sensor data requires manual annotation, transmitting, from a transmitter of the robot to a remote server, an indication of the first set of sensor data and an indication that the first set of sensor data requires manual annotation.

* * * * *